Nov. 13, 1945.    C. F. SCHORN    2,389,003
SPARK, SUPERCHARGER, AND THROTTLE CONTROL
Filed Nov. 16, 1942    7 Sheets-Sheet 1

Carl F. Schorn
INVENTOR.

BY

Nov. 13, 1945.  C. F. SCHORN  2,389,003
SPARK, SUPERCHARGER, AND THROTTLE CONTROL
Filed Nov. 16, 1942  7 Sheets-Sheet 2

Fig. 2

Carl F. Schorn
INVENTOR.
BY

Nov. 13, 1945.  C. F. SCHORN  2,389,003
SPARK, SUPERCHARGER, AND THROTTLE CONTROL
Filed Nov. 16, 1942    7 Sheets-Sheet 3

Fig. 3

Carl F. Schorn
INVENTOR.
BY Stanley M. Udale

Patented Nov. 13, 1945

2,389,003

UNITED STATES PATENT OFFICE 2,389,003

SPARK, SUPERCHARGER, AND THROTTLE CONTROL

Carl F. Schorn, Detroit, Mich., assignor to George M. Holley and Earl Holley

Application November 16, 1942, Serial No. 465,803

10 Claims. (Cl. 170—135.6)

The object of this invention is to automatically control the engine manifold pressure as a function of speed such that at any given engine speed a definite engine power output will be obtained. The control of the manifold pressure will be such that with changing altitudes the power output of the engine will remain substantially constant up to the altitude at which the carburetor is operating at wide open throttle.

An additional object is to substitute a pressure device responsive to torque for the device responsive to manifold air pressure (M. A. P.) so that constant brake horse power would be obtained when operating at constant speed, regardless of whether the supercharger is operating in low or high blower ratio. The above presupposes, of course, that the demand for throttle opening to maintain the constant power does not exceed the carburetor wide open throttle position.

An additional object of this invention is to automatically control the speed change of the supercharger drive responsive to M. A. P., speed of engine and altitude, so that the desired operating combination of power and speed will be continued as long as possible at the lowest possible supercharger speed and so as to obtain maximum fuel economy, especially when "cruising lean."

An additional object is to control simultaneously and automatically the spark advance to give optimum engine operation.

A further object is to control in sequence two superchargers arranged in series, one ahead of the carburetor and one on the engine side of the carburetor.

Figure 1:
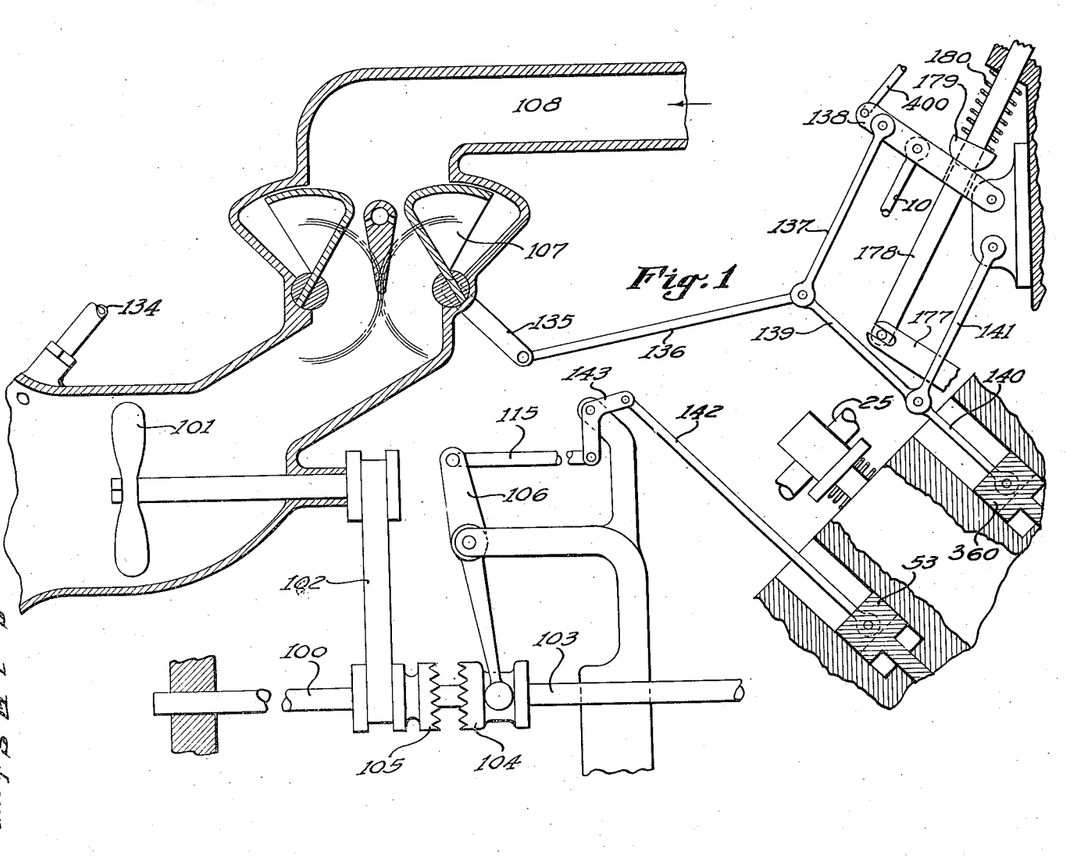
Fig. 1 shows diagrammatically the arrangement of the carburetor with reference to the supercharger when only one supercharger is used located between the engine and the carburetor, and in which this supercharger can be driven at two speeds with relation to the engine speed.

In Fig. 1 the arrangement of the supercharger is shown diagrammatically. The shafts 100 and 103 represent the drive shafts for the supercharger 101 which is shown driven by a belt 102. The shaft 103 revolves at a higher speed than the shaft 100. A clutch 104 is adapted to engage with the clutch 105. Hence, if the lever 143 is moved counter-clockwise, the supercharger 101 is driven at a higher speed, an overrunning clutch (not shown) being provided between the shaft 100 and the clutch 105, to permit clutch 105 to run faster than shaft 100. A carburetor throttle 107 and air entrance 108 are shown diagrammatically leading to the supercharger 101. The lever 143 is connected through link 115, lever 106, with clutch 104, so that the counterclockwise motion of lever 143 causes clutch 104 to engage with clutch 105.

The throttle 107 is controlled by a throttle lever 135. This throttle lever is controlled by the broken link 136, 137 which is controlled by the manually operated lever 138. At the point of juncture of the broken link 136, 137 there is another link 139 which is connected through a link 140 with the element 360 which is the throttle control element of Fig. 5, the functioning of which will be described later. A radius rod 141 is provided for obvious reasons and is joined at the point of juncture of the links 139 and 140.

Figure 5:
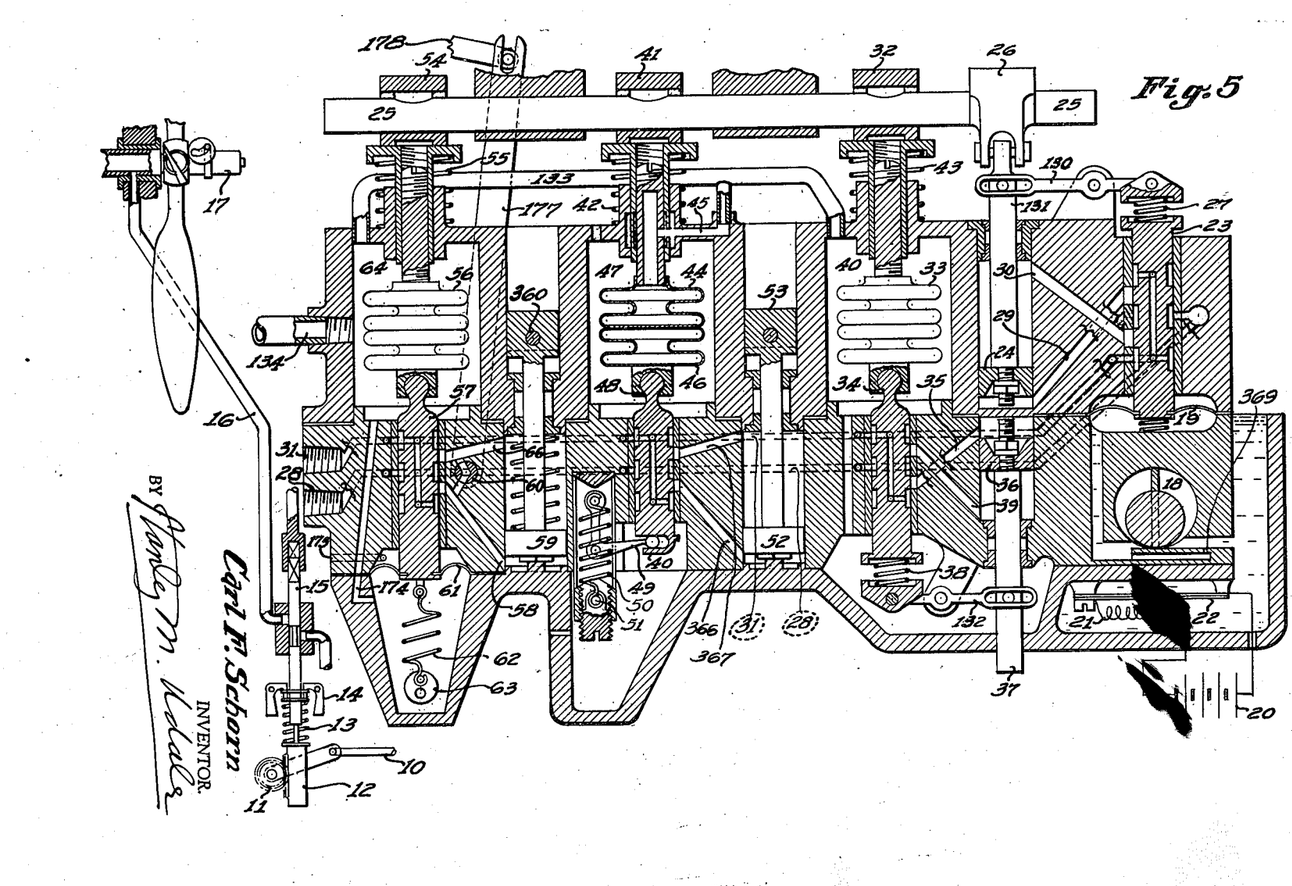
Fig. 5 shows the preferred form of my invention to be used in conjunction with the arrangement shown in Fig. 1.

A link 10 is connected to lever 138 and this is the pitch control lever 10 shown in Fig. 5. The element 53 of Fig. 5 causes the speed of the supercharger to change. It is connected through the link 142 to the bell crank lever 143 which is connected to the link 115, the operation of which causes the clutch 104 to engage with the clutch 105, and thus cause the supercharger propeller 101 to increase in speed, as already described.

The lever 138 is connected by a link 400 to the pilot's cockpit control so that one lever in the pilot's hand controls:

(a) The throttle opening at small throttle openings.

(b) The engine speeds above 1200 R. P. M.

In order to accomplish (a) the following elements are added:

A valve 60 (Fig. 5) is moved by the rod 178, when the lever 138 is moved clockwise to close the throttle and to reduce speed. When the lever 138 engages shoulder 179 on rod 178, the spring 180 is compressed and the lever 177 is also moved clockwise. This opens the valve 60 into the position in which valve 60 is shown in Fig. 5. When in this position, the element 360 is pushed down by the compression spring which engages with the piston 59 hence the piston 59 of the mechanism shown in Fig. 5 is thus rendered inoperative and the throttle is manually closed from the throttle position corresponding to the engine speed of 1200 R. P. M. down to the idle position of the throttle.

Figure 3:
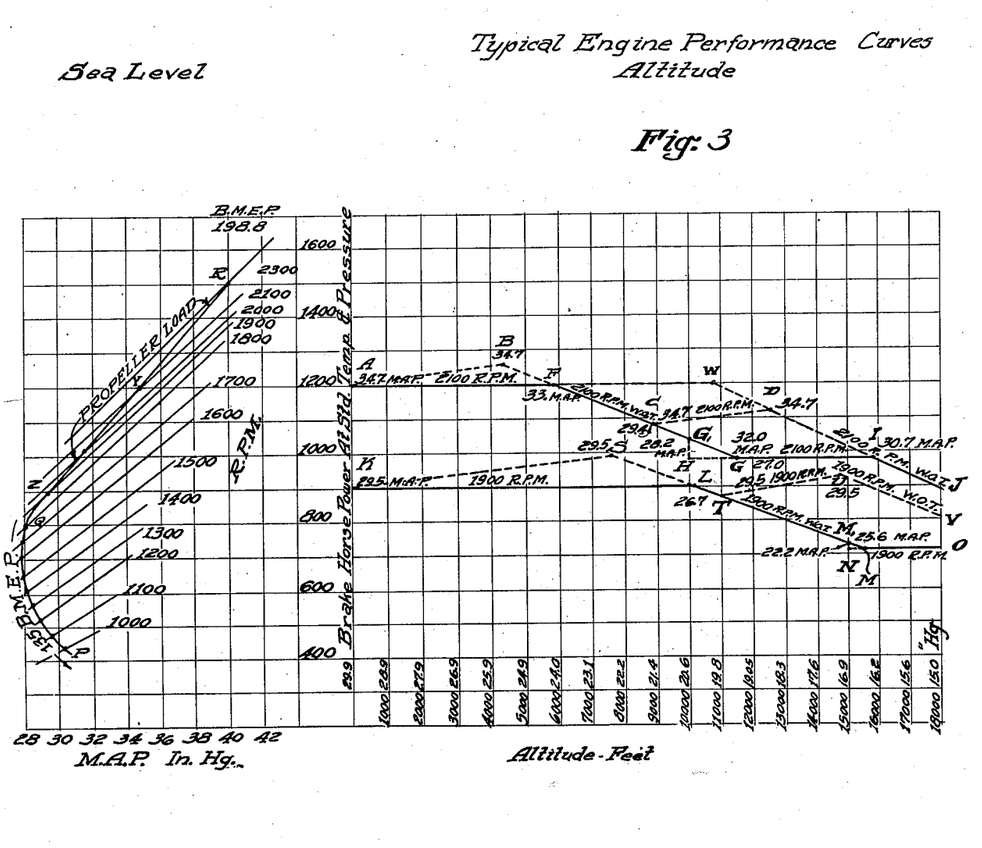
Fig. 3 is a diagram showing a typical curve of desired sea level engine performance as controlled by the power control and also showing the performance of the control for a selected combination of engine speed and power with changing altitudes when the power control is used with the single two speed supercharger illustrated in Fig. 1.

To the left of Fig. 3 is shown the manifold air pressure in inches of mercury at different revolutions per minute of the engine at sea level. Beginning at the point P where we have 30½" of mercury at 1000 R. P. M. and up to the point Q where we have 28" of mercury at 1800 R. P. M., I arrange to have a constant brake mean effective pressure of 135 lbs. per sq. inch. From Q to R which is labeled propeller load, the torque increases and with it B. M. E. P. to 198.8. At the same time, the R. P. M. increases to 2300 and the manifold air pressure increases to 40" of mercury. At this point the engine develops 1500 H. P. which is the maximum H. P. available for take off, but in flying the plane immediately after "take off" the power is lowered and maintained at or below the point A, that is, below 1200 H. P. in order that the engine is not overstressed and that excessive fuel is not used.

Referring to Fig. 3, if the manifold air pressure is held constant at 34.7" of mercury the power increases with altitude due to the effect of low atmospheric pressure on the escape of the exhaust gases. Beginning at the point A, and assuming that the M. A. P. of 34.7" of mercury which exists at point A is maintained constant automatically by opening the throttle 107 in Fig. 1 by the linkage 141, 140, 139, 137, 138, 136, 135, which linkage is operated by the mechanism shown in Fig. 5, specifically by the element 360, at point B the throttle 107 will be wide open, the power will have risen to 1250 H. P. at the rate of approximately 1% per 1000 feet, due to the fall of 4½" mercury in back pressure. From B to C is a condition which the pilot describes as one in which he has run out of throttle. At C the throttle remaining wide open, the power has fallen to below 1100 H. P., and the altitude is now 8800 feet. At this point the clutch 104 automatically engages with the clutch 105, Fig. 1. This engagement is brought about by the linkage 142, 143, 115, 106, 104, 105, which linkage responds to the element 53 of the mechanism shown in Fig. 5 which for this case is calibrated to shift at point C. The supercharger 101 now revolves at a higher rate of speed for the same speed of the engine, as shaft 103 rotates faster than shaft 100, and raises the manifold air pressure above 34.7" of mercury, whereupon the linkage 135, 136, 137, 138, 139, 140, 141, becomes operative to close the throttle, responding to the element 360 of the mechanism shown in Fig. 5, and the manifold air pressure is once more restored to 34.7" of mercury. Again as the plane climbs, the throttle 107 opens to maintain this M. A. P. at 34.7" of mercury until at point D 12,500 feet altitude, the throttle 107 is once more wide open and the power is 1125 at point D, after which the power falls along the line DJ until the ceiling is reached.

Referring to Fig. 3, the line AF indicates constant power from sea level to 6000 feet. At A the manifold air pressure will be 34.7" of mercury, that is, the point where the line AF extended to the left intersects the line 2100 indicates the pressure corresponding to the point Y on the sea level performance line PQR. At F corresponding to 6000 feet altitude, the manifold air pressure will be 33" of mercury with the supercharger 101, Fig. 1 running at the low speed. At the point F the throttle 107 will be wide open. From F to G the throttle will remain wide open and the barometric pressure of the atmosphere will fall from 24" of mercury to 19.6" of mercury (11,300 feet altitude), and the engine power will therefore fall from 1200 to 980 H. P. At this point G the speed of the supercharger will be automatically increased by the action of the elements 53, 142, 143, 115, 106, 104, 105, (Fig. 1), and the throttle is closed by the action of the elements 360, 140, 139, 136, 135 of Fig. 1, to prevent excessive supercharger or manifold pressure.

From G to I, the throttle 107 is gradually reopened by the action of the elements 360, 140, 139, 136, 135 responding to the mechanism shown in Fig. 5, and the power remains constant at 980 H. P. At the point I the throttle 107 is again wide open and the horse power again falls along the line IJ and continues to fall as the altitude increases until the ceiling is reached.

Let us assume that the engine, shortly after taking off, is throttled to a "cruising power," so that only 900 H. P. is developed at point K at sea level at 1900 R. P. M. Extending the line KL to the left, the line PQR is intersected at point Z corresponding to 29.5" mercury M. A. P. developed at point K at sea level at 1900 R. P. M. This 900 H. P. is held constant to the point L which is 10,000 feet when the throttle is wide open. The throttle will then remain wide open to the point M, at which point the second speed of the supercharger will be automatically engaged and the power will remain constant along the line MO until wide open throttle is reached. It will be noticed that when running along the line KLM the supercharger is revolving at a relatively low speed up to 15,400 feet.

Assuming that there is no compensation for altitude, then the M. A. P. will be maintained constant at 29.5" mercury, and therefore the power will increase from 900 H. P. to 990 at the point S, at which point the throttle will be wide open and from then on the power would decline along the line SLT when the second speed of the supercharger will be automatically engaged since it is now assumed that the engine will satisfactorily operate at this M. A. P. and the supercharger is now calibrated to shift at point T and the power will then increase along the line TU as the M. A. P. will be maintained constant at 29.5". At U the throttle will again be wide open with the engine running at 1900 R. P. M. The power would then decline along the line UV.

It will be noted that the second speed comes into action at 11,000 feet whereas the transition from first to second speed indicated at point M occurs at 15,400 so that between 11,000 and 15,400 the line TM represents more economical operation than the line TU.

In Fig. 1, when following the line AFGIJ of Fig. 3, the lever 106 is rotated clockwise when we arrive at the point G and the supercharger is shifted into high speed. The M. A. P. which was 27" at the point G in low blower immediately rises to 32". Since the power output remains the same, the increase of the manifold pressure from 27" Hg in low blower to 32" Hg in high blower is an indication of the increased power required to drive the supercharger at a greater R. P. M.

When the torque is the basis for controlling rather than M. A. P., the H. P. line AF is continued to the point W, Fig. 3 so that the horse power is maintained constant at 1200 H. P. up to an altitude of 10,800. This shows an advantage of torque control over M. A. P. control, of course, the supercharger shifter would then be calibrated to shift at point F. After the point W the power declines along the line WDLJ. Of course, it would not be normal procedure to maintain the power of this engine at 1200 up to such an altitude since the engine would probably be over stressed, but this power would be available in an emergency up to 10,800 feet and therefore this illustrates an advantage in favor of torque control rather than M. A. P. control.

*Operation of control mechanism (Figs. 1 and 5)*

The valve 60 is opened at low power and speed, at which point the engine speed and power respond simply to the throttle. The governor 17 is not operative at engine speeds below approximately 1200 R. P. M. The propeller at the speeds below 1200 R. P. M. is in the pitch determined by the pitch required to develop the manifold pressure required at 1200 to produce the desired performance By the time we get below 1200 R. P. M. for example, the manual control 138 acting through link 178 and lever 177 opens the by pass valve 60 making the automatic mechanism controlling the element 360 inoperative. Thereupon the sole control after 138 engages stop 179 of both engine speed and manifold pressure is the throttle because the speed of the engine has become too low for effective propeller governor operation.

As we rotate the lever 138 anti-clockwise to open the throttle, we release the lever 177 and render the automatic mechanism controlling 360 operative. We thereupon lose the manual control of the throttle and gain the automatic control. At the same time we gain manual control of the speed. Further counterclockwise motion of the lever 138 moves the link 10 so as to increase the manually selected speed of the propeller.

The pump 18 is driven at a speed proportional to the engine speed and is of the positive displacement type and pumps a given quantity of oil per revolution through the orifice 369. This pump, therefore, creates pressures acting on the diaphragm 19, which pressure varies as the square of the selected R. P. M. In order that this should be true, fluid is maintained at a constant temperature by thermostatic means 20, 21 and 22, 20 being a battery, 21 a heating coil, and 22 a strip of bimetallic metal. These are well known elements in general use and will maintain substantially a constant viscosity because they will maintain the fluid rotating in the pump 18 at a constant temperature.

The diaphragm 19 controls a servomotor valve 23 shown in its neutral position. When the valve 23 rises it compresses a spring 27 which is pivotally supported on a lever 130, which lever is connected on its left and through a slot with the piston rod 131. The piston rod 131 is connected with the piston 24 which is controlled by oil under pressure which is supplied through the passage 29 and escapes through the passage 30. When the piston 24 rises due to a rise in the valve 23 in response to an increase in speed causing an increase of pressure on diaphragm 19, oil under pressure enters the device through the lower passage 28 and escapes from the upper passage 31. The lower passage communicates with the servomotor valve 23 which permits oil under pressure to be effective either above or below the piston 24, depending on the position of the valve 23.

When the piston rod 131 rises, it compresses the spring 27 and restores the valve 23 to equilibrium, that is, it moves the valve 23 back into its neutral position. Hence it follows that at every position of the link 10 there will be a definite position for the rod 131. The rod 131 is connected with the lever 26 which rotates a shaft 25.

Obviously, the rod 10 could be directly connected to the lever 26 so that at every speed of the engine there would be a definite position of the shaft 25. However, in that case any manufacturing errors in the production of the propeller control would have to be corrected by suitable calibration of the unit shown in Fig. 5, which would then cease to be an interchangeable unit and would have to be calibrated for each installation. In order to make these units interchangeable without the need for calibration noted above, it is necessary to separate the speed control of the shaft 25 from the pitch control of the propeller.

In Fig. 5, 10 is the manual control for the speed of the engine connected to the manually operated lever 138 (Fig.1). 11 and 12 are the rack and pinion which control a spring 13, which controls governor weights 14, which, in their turn, control the servomotor valve 15, which acts as a slide valve to adjust the pitch of a propeller by means of hydraulic pressure, which is transmitted through a pipe 16 from the servomotor valve 15 to the automatic mechanism (not shown) incorporated in the hub 17 of the propeller.

For every position of the rod 10 there must be a definite number of R. P. M. of the engine. Hence, the speed control rod 10 selects the speed at which the engine is to run and by means hereinafter described it is possible for the pilot to operate the plane with a single control connected to lever 138 shown on the drawing Fig. 1 that is, he simply selects the speed and the automatic device shown in Fig. 5 which is the subject of this invention selects the spark advance, decides when a change of supercharger gear drive is to be made and when the throttle is to be opened or closed.

Obviously, an engine driven centrifugal governor corresponding to the governor shown in the lower left hand corner of Fig. 5 could be substituted for the hydraulic governor shown in the lower right hand corner. In that event elements similar to 13, 14 and 15 would be substituted for the elements 18 and 19 and the valve 23 would then be moved by centrifugal weights instead of by the diaphragm 19.

The operation of the shaft 25, Fig. 5 is as follows:

The rotation of the shaft 25 when viewed from the right is clockwise. In other words, the shaft 25 is actually located below the plane of the drawing, although it is shown as though it were in the plane for the purposes of illustration.

The rotation of the shaft 25 compresses a spring 43 by means of a cam 32. A partially evacuated capsule assembly 33 is thus moved downwardly and carries with it the servomotor valve 34. This permits high pressure oil to flow from the passage 28 and to travel through the passage 35 and become effective on the upper side of the piston 36, pushing the spark control rod 37 down to advance the spark, at the same time compressing the spring 38 through a link 132, which restores the valve 34 to its neutral position. Low pressure oil from below the piston 36 escapes through the passage 39 through the ports in the valve 34, and so out through the passage 31. The chamber 40 containing the capsule assembly 33 communicates with the engine inlet manifold through a pipe 133, chamber 64 and pipe 134 connected to the supercharger of the engine, and is therefore maintained at the pressure of the air entering the engine cylinders.

It has been found desirable that an increase of speed should cause the spark to advance. It has also been found desirable that this tendency of the spark to advance as the speed increases should be counteracted by the effect of the increase in manifold air pressure requiring a later spark. For this reason, an increase of pressure in the chamber 40 causes the capsule assembly 33 to contract and permit valve 34 to rise to retard the spark. Hence the advance of the spark is determined by two variables—namely, the R. P. M. of the engine and the M. A. P.

The clockwise rotation of the shaft 25 also rotates the cam 41, the rotation of which releases the compression of the spring 42 and causes the capsule assembly 44—46 to rise, carrying with it the valve 48. The upper two elements of the capsule are marked 44 and communicate through a passage 45 with the inlet manifold pressure. The capsules 46 are connected to the lower two elements 46 which are partially evacuated capsules. This compound capsule assembly 44—46 is contained in the chamber 47, which chamber is maintained at atmospheric pressure. The capsule assembly 44—46 is connected to the supercharger servo-control valve 48 which is in contact with the bell crank lever 49, which is spring-loaded by the tension spring 50 which is anchored at 51.

By this arrangement, when the downward pressure on the valve 48 is increased, either due to a decrease in atmospheric pressure or an increase in manifold pressure, or a decrease in engine speed, there is an increased downward pressure on the bell crank lever 49, stretching the spring 50 over dead center, so that the valve 48 suddenly moves downwardly when a critical relationship between R. P. M., manifold pressure and atmospheric pressure is reached. This sudden descent of the valve 48 permits high pressure oil from the passage 28 to enter below the piston 52 through the passage 366 to move the piston 52 upwardly. At the same time oil escapes from above the piston 52 through the passage 367 and finally out of passage 31. This piston is connected with the cross head 53 which travels upwardly when the supercharger is shifted from low to high blower position by linkage 142, 143, 115, 106 of Fig. 1.

When the combination of speed, altitude, and M. A. P. is reached at which it is desirable to change the rate of rotation of the supercharger, the rod 115 (Fig. 1) moves to the right, the clutch 104 engages with the clutch 105, the shaft 103 drives the supercharger 101 in place of the shaft 100. There is an overrunning clutch (not shown) which permits the shaft 103 to drive the belt 102 faster than the shaft 100 drives the belt 102. This gives the desired two stage blower drive.

Rotation of the shaft 25 also causes the cam 54 to vary the load on the spring 55, thus the capsule assembly 56 located in the chamber 64 is moved. This chamber 64 is maintained at manifold air pressure through the pipe 134. The descent of the capsule assembly 56 causes the power control servomotor valve 57 to move downwardly, permitting oil under pressure from the passage 28 to pass through the passage 58 and so beneath the piston 59, causing the piston 59 to rise and to move the cross head 360 connected to the carburetor throttle 107 of Fig. 1 by mechanism so as to open the throttle 107 of Fig. 1. The low pressure oil above the piston escapes through passages 66 and 31. A diaphragm 61 connected to the valve 57 is subjected on its upper face to atmospheric pressure through passage 175 and manifold air pressure acts through passage 174 on its lower face. A tension spring 62 anchored to an eccentric support 63 permits a variable load to be applied to the capsule assembly 56 through the valve 57. The combination of diaphragm 61 and capsule 56 enables the M. A. P. to fall with increasing altitude to maintain constant horsepower. A M. A. P. of 33" mercury at 6000 feet permits the engine to develop the same horsepower as is developed at sea level with a M. A. P. of 34.7" mercury.

An increase in manifold air pressure above that called for by the combined effect of the cam 54, diaphragm 61 and spring 62 caused the valve 57 to rise from its neutral position and thereby cause the throttle 107 to close to reduce the M. A. P. to bring the valve back to the neutral position. The effect of a decrease in atmospheric pressure with a given M. A. P. has a tendency to also close the throttle by producing a pressure differential across diaphragm 61 which produces the same effect on valve 57 as excessive M. A. P. It thus results that at any given position of the shaft 25, the M. A. P. decreases with altitude to maintain constant horsepower along the line AF of Fig. 3, which is the result desired.

*Operation—(Figs. 1, 3 and 5)*

The pilot moves the cockpit control lever toward the open position. The pinion and rack are moved by link 10 to select a sufficiently high R. P. M. of the engine to get off the ground. The effect of this R. P. M. on the pump 18 and diaphragm 19 positions the piston 24 and rotates the shaft 25, which has a definite position for every speed selected by the pilot. The shaft 25 having rotated into its operative position, the spark is advanced due to the downward movement of the shaft 37. This downward movement reflects an increase in R. P. M. At the same time, the spark is retarded by the simultaneous increase in M. A. P. Hence, the spark timing reflects the influence of both speed and load. The increasing speed increases the advance; the increasing load decreases the advance in a well known manner. Hence, for any given speed and any given manifold air pressure, there is a definite spark advance.

Consider next the end cam 54 which controls the element 360, Fig. 5 which causes the throttle 107, Fig. 1 to open and close to give the desired M. A. P. determined by the contour of the cam 54. Let us assume that the plane is climbing to 6000 feet. As the plane ascends at a constant R. P. M. the decrease in atmospheric pressure would cause a fall in the M. A. P. should the throttles remain at the sea level opening. This decrease in M. A. P. causes the bellows 56 to expand lowering the valve 57. This, allows oil under pressure to pass through passage 58 and beneath piston 59. The piston raises element 360 and through the mechanism shown in Fig. 1 opens the throttles 107 until the M. A. P. becomes sufficient to compress the bellows 56 to restore the valve 57 to its neutral position. At the same time, as the plane ascends, the decrease in atmospheric pressure on the upper side of the diaphragm 61 tends to push the valve 57 in an upward direction. This upward displacement produces the same effect as excessive M. A. P. and thereby reduces the M. A. P. required to place the valve in its neutral position. By this means, a sufficient reduction in M. A. P. occurs with increasing altitude to offset the effect of the reduction of the back pressure on the engine exhaust and thereby maintain substantially constant B. H. P. Referring to Fig. 3, if the plane starts its climb at sea level with the engine operating at 34.7 M. A. P. and 2100 R. P. M. it would climb along the constant R. P. M. curve AF and would reach the carburetor wide open throttle position at approximately 6000 feet. The M. A. P. would have fallen from 34.7" Hg at sea level to 33" Hg at 6000 feet. The plane would then continue to climb with the engine operating in low blower along the constant R. P. M. line FG until 11,300' altitude is reached. The manifold pressure will have dropped to 27" Hg and the power will have dropped to 980 B. H. P.

At 11,300 feet it is desired to shift from low speed supercharger operation to high speed operation. At the operating speed of 2,100 R. P. M. the cam 41, Fig. 5 definitely locates the top of the capsule assembly 44—46. The bottom position is definitely determined by the pressure in the chamber 47, that is to say, by the atmospheric pressure which effects the length of the entire capsule assembly 44—46 and by the M. A. P. which effects the length of the element 44. The net result is that the supercharger control valve 48 exerts increasing pressure on the bell crank lever 49 which rotates clockwise and snaps over under the influence of spring 50, when it comes over dead center. The piston 52 immediately moves up and shifts the supercharger drive from low to high speed and the plane continues to climb with the engine operating in high blower at substantially the same B. H. P. that was available just before the shift. It is to be noted that the operation in high blower at 11,300 is at 32" M. A. P. The increase in M. A. P. in high blower over the M. A. P. in low blower to produce the same B. H. P. is an indication of the less efficient operation in high blower and demonstrates why the shift should not be made at an altitude lower than that at which the B. H. P. in high blower equals the B. H. P. in low blower; for instance, if the shift to high blower had been made at 10,000 feet instead of 11,300 feet, approximately 60 B. H. P. less would be obtained in high blower than in the low blower operation as shown by the broken lines GHG, Fig. 3. When descending the reverse action takes place shifting the supercharger from high speed to low speed. The altitude at which the shift will take place will be somewhat lower than 11,300 of course, this being inherent in the design.

When climbing above 11,300 feet the engine will operate along the line G—I. At I the wide open throttle position of the carburetor is reached and operation takes place along the constant speed decreasing power lines IJ.

*Alternative construction (Figs. 2, 4 and 6)*

Figure 2:
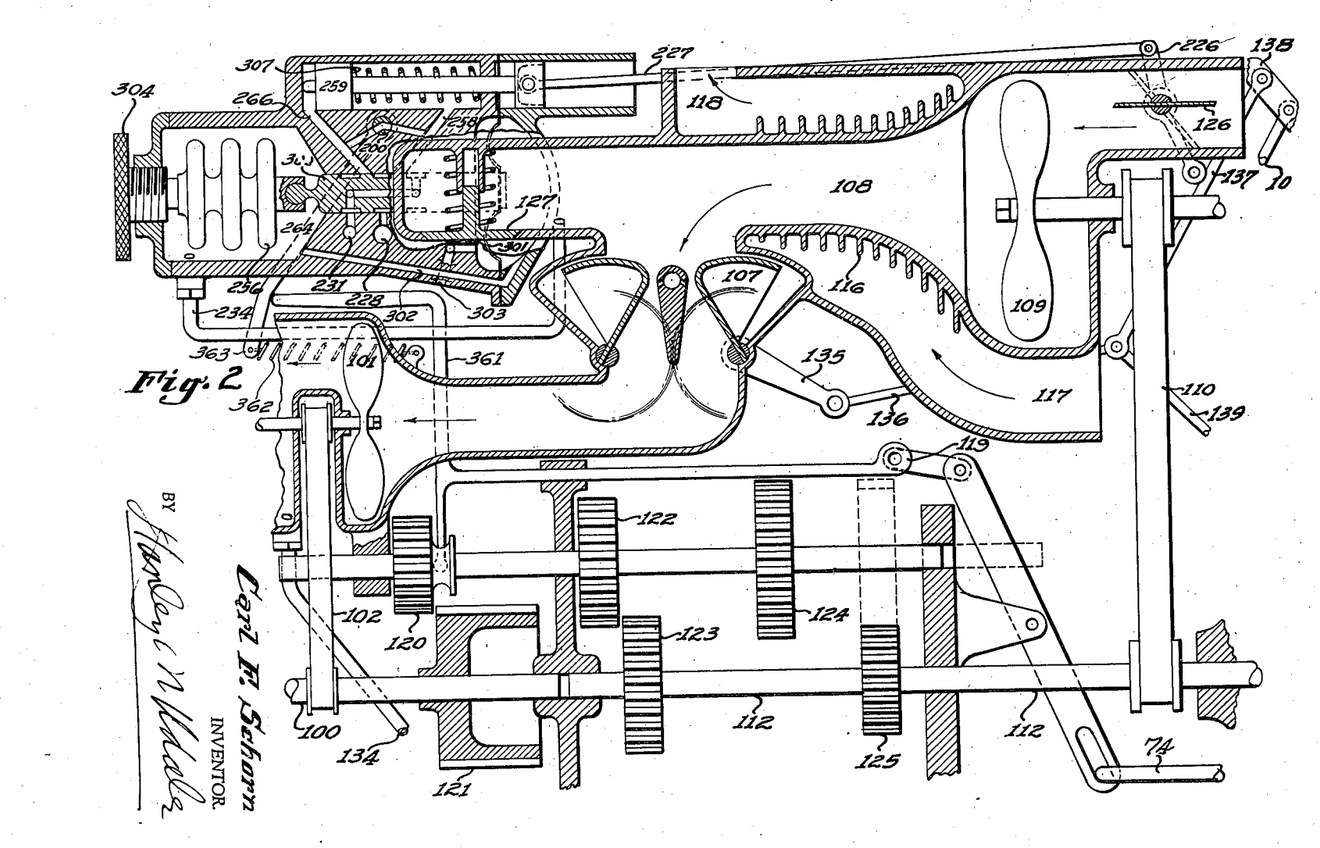
Fig. 2 shows a similar arrangement in which there are two superchargers, one located in the air entrance to the carburetor and the second one between the carburetor and the engine, the first one being driven at one of two speeds or permitted to be idle; the second one being driven at a constant ratio to the engine speed.

When two superchargers are used one supercharger 101 of Fig. 2, is located between the carburetor and the engine and this one is run at a constant speed ratio and is always in gear.

An auxiliary supercharger 109 is located in the air entrance 108 leading to the carburetor throttle 107. This auxiliary supercharger may be idle or operated at low speed ratio or at a high speed ratio.

Figure 4:
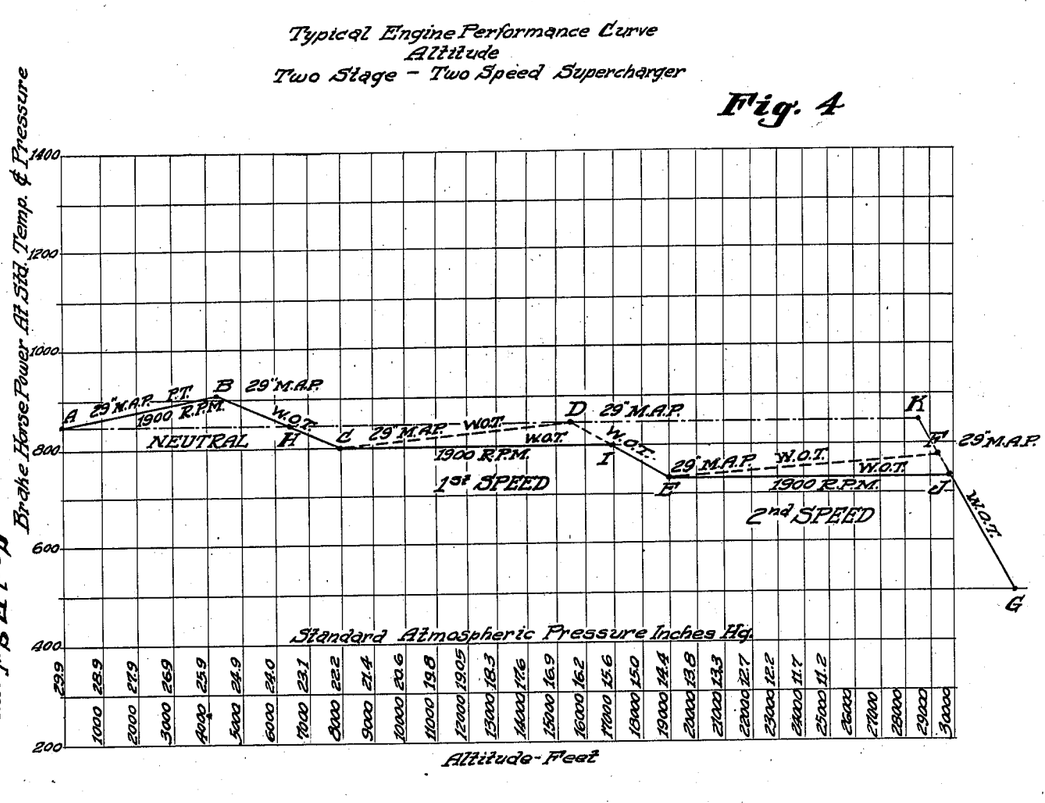
Fig. 4 is a diagram of control performance showing the operation of the control with changing altitudes for a selected combination of engine speed and power when the power control is used with the two superchargers illustrated in Fig. 2.

In Fig. 4 starting with the power at point A corresponding to 1900 R. P. M. and 850 H. P. and running with a manifold air pressure of 29", which manifold air pressure is automatically maintained constant, at the point B we have an increase of 50 horse power to 900 corresponding to an altitude of 4200 feet and a barometer of approximately 25½" of mercury. At this point the throttle 107 is wide open and the B. H. P. therefore, as the plane climbs, declines on the line BC until the B. H. P. falls to 800 at the point C.

This occurs at 8000 feet altitude, barometer 22.2" of mercury. At this point the auxiliary blower 109 is engaged in low speed ratio and the throttle 126 which has been open up to this point moves to a partially closed position and the manifold air pressure is again restored to 29" of mercury. Thereupon the power rises along the broken constant M. A. P. line CD. At the point D we again have 850 B. H. P. and we have an altitude of 15,500 feet and barometer of 16½" of mercury. At this point both throttles are wide open, the power thereafter declines until the point E is reached, at which time the second speed of the auxiliary supercharger becomes operative and the auxiliary blower throttle again moves to partially closed position, and the power increases along the broken line EF with the manifold air pressure being again maintained constant at 29" of mercury. At the point F we have a B. H. P. of 770, we have an altitude of 29,200 feet and we have a barometer of less than 10" of mercury. At this point both throttles are again wide open and the B. H. P. declines along the line FG as the plane continues to climb until the ceiling is reached for this condition.

Repeating the process and assuming a constant power is maintained in the events that occur after the point C is reached, we have the following conditions:

At the point C when the first speed of the auxiliary supercharger 109 becomes operative, the power is maintained constant at 800 H. P. along the full line CI by varying the pressure in the air entrance. At the point I we have an altitude of 17,000 feet and a barometer of 15.6" of mercury. The power declines along the line IE and power is 730 at the point E, the altitude is 19,000 feet, the barometer being 14.4. The power then remains constant along the line EJ. The point J corresponds to an altitude of 29,900 feet, at which point the horse power declines along the line JG until the ceiling of the plane is reached.

Fig. 2 shows the arrangement in which there are two superchargers. As before, 100 is the drive shaft for the supercharger 101 which is driven through the belt 102 at a constant ratio, so that in this case the supercharger 101 operates at a fixed speed for any given R. P. M. of the engine.

107 indicates the carburetor throttle with throttle lever 135. 108 indicates the air entrance on the engine side of a second supercharger 109 which is driven by a belt 110. Located in the air entrance there is an intercooler 116, to which cooling air enters at 117 and escapes at 118. The supercharger 109 is driven by a shaft 112, and in the position shown it is idle. There are two speeds at which the shaft 112 can be run. When the link 119 moves the gear 120 so as to engage with the gear 121 mounted on the shaft 100, the shaft 112 is driven through the gears 122, 123. Further movement of the link 119 causes the gear 122 to be disengaged from the gear 123, the gear 124 then becomes engaged with the gear 125, and the speed of the supercharger 109 is increased. Meanwhile the gear 120 remains in gear with the gear 121. Therefore, there are three positions for the link 119—the position shown in which the supercharger 109 is in operative; the second position when the gear 122 meshes with the gear 123, and the third position when the gear 124 meshes with the gear 125. We thus have three conditions: one where the supercharger 101 operates alone; secondly, where the supercharger 109 operates at low speed in conjunction with the supercharger 101; and thirdly, where the supercharger 109 operates at high speed in conjunction with the supercharger 101. The throttle 126 which leads to the supercharger 109 should be open when the supercharger 109 is idle. Air is admitted through the valve 126 through the idling supercharger 109 and also past the spring loaded valve 127 past the carburetor throttles 107. When the supercharger 109 is in operation the valve 126 operates from partially open to open position and the valve 127 is closed.

In the upper left hand corner of Fig. 2 is shown a servomotor which controls the throttle 126, which throttle 126 controls the air supply to the supercharger 109. A description of this servomotor and its operation is as follows:

A partially evacuated capsule 256 is shown located in a chamber 264 connected through a pipe 234 with the air entrance 108 on the engine side of the supercharger 109. The device is shown in the position it assumes just before point C of Fig. 4, that is just before the gear 120 engages with the gear 121. In this position the rod 119 holds the valve 200 in the wide open position by means of a push rod 361 which engages with a lever 363 which is mounted on the valve 200. A spring 362 causes the lever 363 to follow the rod 361 so that when the gear 120 engages with the gear 121 the valve 200 moves to the closed position and the mechanism operating 126 becomes operative. In the position just before the point C of Fig. 4 already referred to, the valve 200 being wide open, the pressure on both sides of the servomotor piston 259 is equal. Therefore, the piston 259 is pushed over to the left by the compression spring 307. Hence, the link 227 pulls the lever 226 to the left and therefore the throttle 126 is held wide open.

From the point B back to sea level at A, the power falls, the throttle 107 being controlled as in Fig. 1. In this case, the control is not corrected for altitude but is designed to maintain a constant manifold air pressure at 29".

Returning to the condition corresponding to the point C of Fig. 4 when the plane ascends above 8,000 feet altitude, then the gear 120 engages with the gear 121 and the gear 122 with the gear 123, the link 119 being shifted to the right, and when this happens the valve 200 is closed and the servomotor becomes operative and the supercharger 109 starts to function at its lower speed ratio.

The operation of the blower 109 tends to raise the pressure in the air entrance 108 and therefore in chamber 264 which tends to collapse the evacuated bellows 256 and to move the servomotor valve 300 to the left, which moves the rod 227 to the right to close the throttle 126 until the inlet pressure to the carburetor is equal to that for which the control is set in this case about 25.5" Hg. The action of the servomotor is as follows:

As the pressure in 264 increases, the valve 300 moves from the neutral position shown to a position to the left of the neutral position. In this second position, oil enters under pressure from a passage 228 through an annular passage around the valve 300 through the passage 266 to the left hand side of the piston 259. This oil pressure pushes the piston 259 over to the right, pushes the link 227 to the right and closes the valve 126 by clockwise rotation of the lever 226. Meanwhile oil escapes through the passage 258 through the center of the valve 300 to the oil outlet 231. The closing of the valve 126 restores the pressure of 25.5" of mercury in the chamber 264 because at this pressure the system is in equilibrium. At 25.5" of mercury, the valve 300 then returns substantially to the neutral position shown. Just enough pressure is admitted to the left hand side of the piston 259 to overcome the spring 307. In other words, the valve 126 floats so as to maintain a pressure in the chamber 264, that is to say, in the air entrance 108, or 25.5" of mercury.

As we climb above 8000 feet, the horse power climbs on the constant M. A. P. line from C to D (Fig. 4) and reaches 850 H. P. 15,500 feet. From the point C to the point D the throttle 107 remains wide open, and the valve 126 gradually opens until it is wide open at point D. Thereafter the power falls from D to E, reaching a power of 730 at point E, that is at about 19,000 feet. At the point E conditions that occurred at point C are repeated, that is to say, the link 119 again moves to the right, the gear 122 is disengaged from the gear 123, and the gear 124 engages with the gear 125, but the gear 120 remains in mesh with the gear 121.

The net result is an increase in speed of the blower 109 which means an increase of pressure in the chamber 108 above the 25.5 mercury, which means an increase of pressure in the chamber 264, which means that the valve 300 once more moves to the left and the action already described is repeated. The valve 126 is again partially closed so as to maintain in the chamber 108 a pressure of 25.5 of mercury.

The operation described with reference to the change from C to D is repeated as the engine climbs along the line EF, that is to say, it climbs from 19,000 feet to 29,200 feet with the throttle 126 gradually returning to its wide open position. At the point F the throttle 107 and the throttle 126 are both wide open and in the langauge of the pilots "we have run out of throttle" and therefore, the power falls rapidly along the line FG and continues to fall until the ceiling of the plane is reached.

In order to obtain the performance corresponding to the horizontal lines CI and EJ of Fig. 4, it is necessary to modify this arrangement by means of a diaphragm 301. This diaphragm is connected to the end of the valve 300 and is subjected to the same pressure as exists in the chamber 264 through the passage 302. This diaphragm is subjected on its left hand face to the atmospheric pressure through a passage 303.

An adjustment 304 is provided for the valve 300 which adjusts the zero position of the evacuated element 256. Assuming the engine is operated at the point corresponding to C of Fig. 4, the moment the second supercharger 109 becomes operative at the speed determined by the gear ration 121, 120, 122, 123, the pressure in 108 increases above 25.5. When this happens the element 256 is compressed and collapses and the valve 300 travels to the left and then the piston 259 travels to the right, as already described. The valve 126 is thus closed until equilibrium is reached when the pressure in the chamber 108 is at a pressure less than 25.5 as modified by the action of the diaphragm 301.

The function of the diaphragm 301 is as follows: In climbing above point C on Fig. 4, 8000 feet, the atmospheric pressure admitted through 303 on the left hand side of the diaphragm 301 becomes lower than the inlet pressure existing in 108 which is transmitted through the passage 234 and 302. This pressure differential causes a load to act on the valve 300 which tends to compress the partially evacuated bellows 256. Therefore, this decrease is atmospheric pressure has the same effect on the bellows 256 as an increase in air pressure in the air entrance 108 would have. The control therefore acts to close the valve 126 or rather to move in the direction of closing which reduces the air entrance pressure until the valve 300 moves back into the neutral position shown. The area of the diaphragm 301 is therefore selected so that its influence on the pressure in chambers 264 and 108 is just enough to maintain the power constant along the line CI, Fig. 4.

Figure 6:
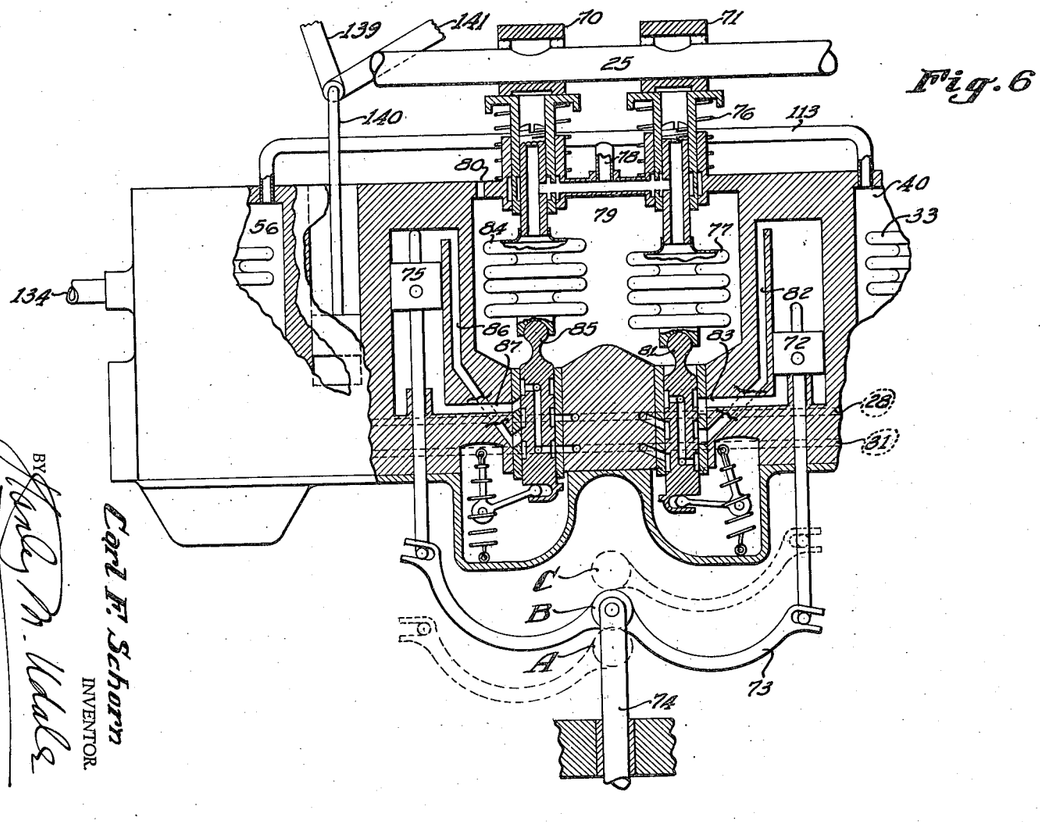
Fig. 6 shows the alternative construction when my invention is used in connection with the two superchargers as arranged in Fig. 2.

Fig. 6 shows the automatic device required to change the speed in the two stage supercharger to obtain the performance corresponding to line ABCIEJG or the line ABCDEFG Fig. 4 when climbing. By this means, the rod 74 will be in the position marked C Fig. 6 before reaching the point C Fig. 4. When the rod 119 is moved by rod 74 so as to engage the gears 120, 121, 122, 123, the rod 74 is then moved into the position shown in full marked B which carries with it the rod 119 from the position in which the rod 119 is shown in Fig. 2, which position corresponds to the condition just prior to point C of Fig. 4. When climbing, and the conditions correspond to the point C of Fig. 4, the mechanism shown in Fig. 6, specifically the rod 74, is just at the point of departing from the position marked C into the position marked B, which is the position illustrated in full lines in Fig. 6. When descending from above 8000 feet, when passing through the point C the change back does not occur at the same 8000 feet altitude, but is delayed somewhat because of the snap action controlling the valve 81.

In Fig. 6 the shaft 25, as before, rotates controlling cams. The cam 71, for example, corresponds to cam 41 of Fig. 5. However, there are two stages now and therefore a second cam marked 70 is required to control the second shift. The piston 72 corresponds to the piston 52 on Fig. 5 and the beam 73 to which it is connected corresponds to the sliding element 53 of Fig. 1. The rod 74 is the means whereby the two speeds of the auxiliary supercharger are controlled. The position C corresponds to the neutral stage, Fig. 4, that is to say, that portion of the chart ABC; the position B to the first speed that portion of the chart marked CIE, and the position marked A corresponds to the second speed, that is to the line EJG. The left hand side of the beam 73 is connected through a slotted connection with the piston 75, the movement of which controls the second speed, or higher speed of the auxiliary supercharger 109. The first speed ratio of 109 is indicated as CI of Fig. 4 and is controlled by the cam 71 which compresses the spring 76 and also compresses the aneroid bellows 77. The two upper elements of this aneroid bellows 77 communicate through a pipe 78 with the pipe 113 which connects through pipe 134 with the supercharger of the engine, that is to say, with the engine side of the supercharger 101 of Fig. 2. Hence the two upper elements of the bellows 77 have supercharger pressure, or manifold air pressure, on the inside and are subjected to atmospheric pressure from the outside as the chamber 79 in which the bellows 77 is located is vented to the atmosphere through a passage 80.

The two lower elements of the bellows 77 are partially evacuated, for example, to a pressure of 10" of mercury and are thus responsive to both temperature changes and pressure changes. The valve 81 is connected to the aneroid bellows through a spherical connection. The valve 81 is shown just after it has admitted oil under pressure from the pipe 28 through the passage 82 to the top of the cylinder in which the piston 72 is located. In other words, we assume that we have just passed the point C of Fig. 4. From the bottom of the cylinder oil escapes through the passage 83, through the center of the valve 81, to the low pressure outlet 31. Hence, as the plane climbs above the level corresponding to the point C of Fig. 4, that is above 8000 feet, the atmospheric pressure admitted to the chamber 79 falls, the aneroid bellows 77 expands causing the valve 81 to descend to a point where the trip over mechanism passes through center and the piston 72 descends for the reasons already set forth and the rod 74 descends from position C to position B, making the first change from neutral to the first speed of the control of the auxiliary supercharger 109. In other words, 119, Fig. 2, moves to the right and gears 120, 121, 122, 123 cause the auxiliary supercharger 109 to become effective. At the same time the valve 200 is closed, rendering the servomotor on the left hand side of Fig. 2 effective to control the air inlet valve 126.

As the plane continues to climb the pressure of the atmosphere continues to fall. The aneroid bellows 84 contained in chamber 79 and controlled by the cam 70 now comes into its effective position, and it, too, expands pushing down, in its turn, the valve 85 which when the valve descends, admits oil pressure through the annular port of the valve 85 to passage 86, and allows oil to escape through the center of the valve 85 and from the passage 87 from the underside of the piston 75 to the outlet passage 31. Hence, the two ends of the beam 73 are moved at different stages so that there is an initial movement and a second movement, so that the two supercharger speeds can be successively regulated according to the altitude. Otherwise the operation of this is similar to that of Fig. 1.

Figures 7, 8:
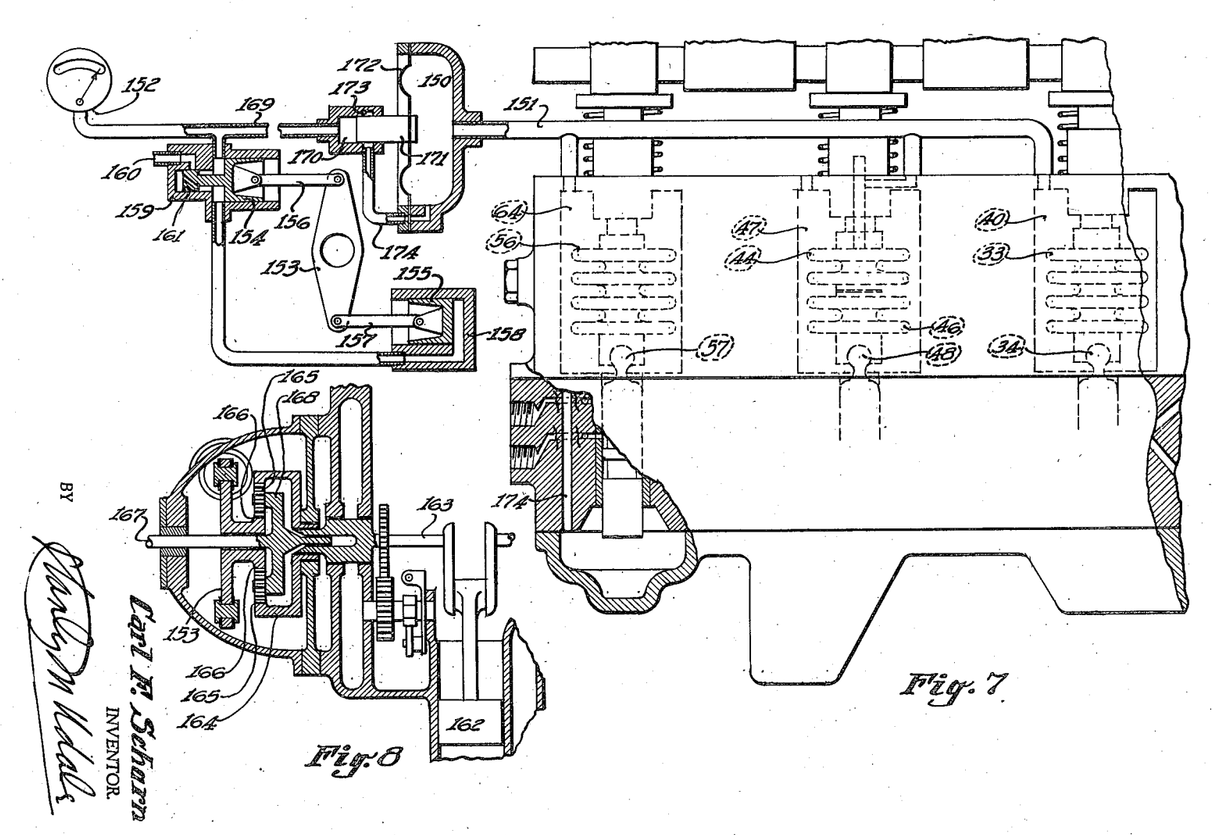
Fig. 7 shows a modification of Fig. 5 in which the torque developed by the engine is substituted for M. A. P. as a factor in the control of my device.
Fig. 8 shows the means for developing the fluid pressure proportional to the torque developed by the engine.

*Figs. 7 and 8—Torque control*

Figs. 7 and 8 show the means whereby torque or rather a pressure responsive torque, may be substituted for manifold air pressure.

Fig. 7 is an outside view of Fig. 5 with certain modifications. For example, the diaphragm 61 of Fig. 5 has been omitted. In Fig. 7, 150 indicates the chamber in which oil is present at a pressure responsive to the torque. This chamber communicates through a pipe 151 corresponding to the pipe 133 of Fig. 5 and this pipe communicates first to the chamber 64, second to the interior of the upper two elements 44 in the chamber 47, and finally to the chamber 40 containing the evacuated element 33. By this means the torque pressure takes the place of manifold air pressure in all three chambers, that is, in the chamber 40, in the interior of element 44, and in the chamber 64 surrounding the evacuated element 56. Hence the operation will be almost the same as before, that is to say, as the torque increases the element 56 will be contracted, the element 44 will be expanded and the element 33 will be contracted and the valves 57, 48, 34 will move so as to respond to an increase in torque, and the operation will be similar to that described for Fig. 5.

In order to obtain low operating pressures corresponding to the high torque pressure, it is necessary to couple the chamber 150 with the device operating the torque indicator 152. This torque indicator is operated as follows:

A torque lever 153 whose relation to the engine is indicated in Fig. 8, is coupled to two pistons 154, 155. These pistons are connected through the links 156, 157 with the lever 153. They reciprocate in the cylinders 158 and 159. Oil under pressure is supplied through the pipe 160 and the valve 161 admits oil under pressure to the cylinders to balance the torque, that is to say, when the pressure is higher than that required to balance the torque, the valve 161 cuts off the admission of oil under pressure from the pipe 160. The element 153 in Fig. 8 is connected to an engine shown diagrammatically, the piston being shown at 162. This piston 162 drives the crank shaft 163, which, in its turn, drives the outer internal gear 164 inside which rotate the small gears 165 which, in their turn, engage with the external gear 166. This gear 166 is integral with the element 153. The propeller drive shaft 167 is driven by the small gears 165, which are mounted on a spider 168, so that the drive is from the crank shaft 163 through the gear 164 through the small pinions 165 to the spider 168, which spider is integral with the propeller drive shaft 167. The torque reaction is thus taken by the element 153. Hence the pressure inside the cylinders 159 and 158 corresponds to the torque. In order to reduce this pressure to a more manageable value, the pipe 169 is connected into the chamber 170 in which reciprocates a small piston 171.

This piston 171 is connected with the diaphragm 172 which forms the left hand wall of the chamber 150. Now the large pressure on the small piston 171 must balance the low pressure on the large diaphragm 172. If there is leakage through the pipe 151 as is inevitable, the piston 171 moves to the right, uncovering the communication of an annular port 173 which is connected to a pipe 174 which discharges oil under pressure to the chamber 150. Therefore, when leakage takes place this leakage is made good by the oil supplied from the pipe 160 but the ratio of the pressure in 170 to the pressure in 150 is as the area 150 to the area of 170.

The above description applies to the substitution of torque for M. A. P. in the mechanism shown in Figs. 1 and 5, and when this is done the upper line of Fig. 3 is changed to that shown as AFWDIJ which indicates an advantage in favor of torque control over the M. A. P. control. The supercharger shifter is designed to shift at point F in the above case. If this torque control be substituted for M. A. P. in Figs. 2, 4 and 6 the advantage gained is not so marked. Using torque as a substitute for M. A. P. when applied to the arrangement shown in Figs. 2, 4 and 6, the horse power no longer climbs (Fig. 4) from A to B, but follows the AHDKG line. The diaphragm correction device 301 which modifies the control of the inlet valve 126 will not be required. The auxiliary supercharger would be shifted into low speed ratio at point H and into high gear ratio at point D. In the case where the M. A. P. is used, it is to be noted that after passing the point B, (Fig. 4) the throttle 107 is wide open at all times and the power output thereafter is controlled by the throttle 126, Fig. 2 and by the gear shift. On the other hand when torque is used, the throttle 107 operates to control the torque from the point A to K and during this period the valve 126 operates to maintain a constant pressure equal to 25.5" of mercury in the chamber 108.

What I claim is:

1. In combination with an aircraft engine having a variable pitch propeller adapted to control the engine at a selected constant speed, manually operated control means for selecting said constant speed of the engine, an engine driven supercharger, a change speed transmission therefor including a clutch, automatic clutch control means for said transmission comprising a snap action valve shifting mechanism, a servomotor valve connected thereto, a servomotor controlled by said valve, means controlled by the speed of the engine and by the pressure created by said supercharger and by the atmospheric pressure to operate the snap action valve shifting mechanism to cause the servomotor to operate the clutch to change the relative speed of the supercharger at the desired combination of engine speed, manifold air pressure, and altitude.

2. In an internal combustion engine for an airplane having a variable pitch propeller adapted to maintain the engine speed at a selected speed, the combination of a supercharger located in the air entrance, a throttle valve located in the air entrance to said supercharger, a second supercharger located on the engine side of said first supercharger and in series therewith a second throttle located in the entrance to said second supercharger, a carburetor located between the first and second superchargers, a single manually operated lever for selecting the desired engine speed, said lever being also connected to the second of the two throttles, means responsive to the air pressure existing on the engine side of said second supercharger known as the manifold air pressure and to the engine speed for first opening the second throttle to maintain a selected manifold air pressure while operating with the first supercharger idle, the first throttle meanwhile being held open, and then, as the plane continues to ascend to the point where the second throttle has become wide open, means responsive to engine speed, atmospheric pressure and manifold air pressure for engaging the outer of the two superchargers in low speed ratio and thus raising the pressure of the inlet air entering the carburetor, means responsive to said inlet air pressure for regulating the said inlet pressure by controlling the first throttle so as to control the air pressure leading to the carburetor, further means responsive to difference between the air pressure in the inlet to the carburetor and the atmospheric pressure to modify the inlet pressure so that constant brake horse power is maintained after said first supercharger becomes operative, further means responsive to the revolutions per minute of the engine, to the pressure of the atmosphere, and to the manifold air pressure for increasing the relative revolutions per minute of the first supercharger after the first throttle has become wide open in order to control the desired inlet air pressure as the plane continues to climb to higher altitudes.

3. In an internal combustion engine for an airplane having a variable pitch propeller adapted to control the engine at a manually selected speed, a two speed supercharger therefor, a throttle valve in the inlet leading to said supercharger, automatic means for selecting the relative speed of the supercharger and the position of said throttle comprising a servomotor responsive to the conjoint action of the air pressure existing on the engine side of said supercharger known as the manifold air pressure, to the speed of the engine, and to the atmospheric pressure adapted to select the ratio of the supercharger drive, a second servomotor responsive to the conjoint action of the manifold air pressure, engine speed and to the difference between the manifold air pressure and the atmospheric pressure adapted to obtain a decreasing manifold air pressure with altitude so as to produce a constant brake horse power by controlling the position of the throttle.

4. In an internal combustion engine for an airplane having a variable pitch propeller adapted to control the engine at a manually selected speed and having torque responsive means, the combination of a two-speed supercharger therefor, a throttle valve located in the entrance leading to said supercharger, means including a servomotor for selecting the relative speed of the supercharger, said means being responsive to said engine torque responsive means, to the speed of the engine and to the atmospheric pressure, means including a servomotor for controlling the throttle admitting air to said supercharger, said means being responsive to engine speed and to torque to control the throttle so as to maintain constant brake horse power.

5. In an airplane engine of the spark ignition type and having a variable pitch propeller adapted to control the engine at a manually selected speed and having torque responsive means, including a servomotor for regulating the spark advance, said means being responsive to said torque responsive means and additional means responsive to the engine speed for regulating said spark advance, said means responsive to the torque opposing the means responsive to the engine speed so that as the speed goes up, the spark is advanced, and as the torque is increased, the spark is retarded, so that the net advance or retard is the difference between the two.

6. In a supercharged airplane engine of the spark ignition type, having a variable pitch propeller adapted to control the engine at a manually selected speed and said engine having torque responsive means, automatic means responsive to the speed, a single manually operated lever adapted to control said speed, said automatic means being also responsive to torque and to atmospheric pressure and being adapted to control the spark advance, the position of the throttle and to select the relative speed of the engine driven supercharger, whereby the horse power is maintained at predetermined values at every altitude and at each speed.

7. In an internal combustion engine for an airplane having a variable pitch propeller incorporating speed responsive means adapted to control the engine at a manually selected speed, a second speed responsive means independent of the first mentioned speed responsive means, an engine driven supercharger, a change speed transmission therefor including a clutch, automatic clutch control means for said transmission comprising a snap action valve shifting mechanism, a servomotor valve connected thereto, a servomotor controlled by said valve, means controlled by the speed of the engine and by the pressure created by said supercharger and by the atmospheric pressure to operate the snap action valve shifting mechanism to cause the servomotor to operate the clutch to change the relative speed of the supercharger at the desired combination of engine speed, manifold air pressure and altitude automatic means for controlling the spark advance, said means being responsive to engine speed and manifold air pressure, automatic means for controlling the throttle opening to maintain a desired brake horsepower, said means being responsive to engine speed, manifold air pressure and the difference between manifold air pressure and the atmospheric pressure.

8. In an internal combustion engine for an airplane having a variable pitch propeller adapted to control the engine at a manually selected speed, a two-speed supercharger therefor, a throttle valve in the inlet leading to said supercharger, automatic means for changing the relative speed of the supercharger and the position of said throttle comprising a servomotor responsive to the conjoint action of the manifold air pressure existing on the engine side of said supercharger, to the speed of the engine, and to the atmospheric pressure and so constructed and arranged as to operate the speed changing means of the supercharger drive, a second servomotor responsive to the conjoint action of the manifold air pressure and to the engine speed and so constructed and arranged as to control the position of the throttle so as to maintain a constant manifold air pressure.

9. In an internal combustion engine for an airplane having a variable pitch propeller adapted to control the engine at a manually selected speed and having torque responsive means, the combination of a supercharger therefor, a throttle valve located in the entrance to said supercharger, means including a servomotor so constructed and arranged as to control said throttle, said means being responsive to engine speed and torque to control said throttle so as to maintain constant brake horsepower.

10. In an internal combustion engine for an airplane having a supercharger, a variable pitch propeller adapted to control the engine at a manually selected speed and having torque responsive means, the combination of a drive for said supercharger having two speeds and speed changing mechanism associated therewith, means including a servomotor for operating said speed changing mechanism, said means being responsive to said engine torque responsive means, to the speed of the engine, and to the atmospheric pressure.

C. F. SCHORN.